3,329,604
HYDROCARBON CONVERSION CATALYSTS CONTAINING A MANGANESE PROMOTER ON A CRYSTALLINE ZEOLITE FOR THE HYDROCRACKING OF HYDROCARBONS
William Judson Mattox and Glen Porter Hanmer, Baton Rouge, La., assignors to Esso Research and Engineering Company, a corporation of Delaware
No Drawing. Filed Feb. 21, 1964, Ser. No. 346,391
11 Claims. (Cl. 208—111)

This invention relates to improved catalyst compositions and their use in hydrocarbon conversion processes, said catalyst compositions comprising synthetic crystalline alumino-silicate zeolites containing manganese.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve. A number of these zeolite materials are described, for example, in U.S. Patents 3,013,982–86 wherein they are characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes.

In general, the chemical formula of anhydrous crystalline alumino-silicate zeolites expressed in terms of moles may be generally represented as:

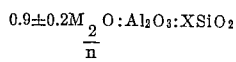

$$0.9 \pm 0.2 M_{\frac{2}{n}} O : Al_2O_3 : XSiO_2$$

wherein M is selected from the group consisting of hydrogen, monovalent and divalent metal cations and mixtures thereof; $n$ is its valence, and X is a number from about 1.5 to about 12, said value being dependent upon the particular type of zeolite. The zeolite as produced or found naturally normally contains an alkali metal such as sodium or an alkaline earth metal such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g. synthetic faujasite, mordenite, etc., will also have varying silica to alumina ratios depending upon such variables as composition of the crystallization mixture, reaction conditions, etc.

For use in hydrocarbon conversion processes, the higher silica to alumina zeolites will be preferred because of their higher stability at elevated temperature. Therefore, whereas the present invention contemplates the use of zeolites in general, those having silica to alumina mole ratios above about 3 will be preferred. Typical among these is the synthetic faujasite variety, wherein X in the above formula is about 3 to 7, preferably 3 to 6, most preferably 4 to 5.5; and the synthetic mordenite variety, wherein X is about 8 to 12, preferably 9.5 to 10.5. To be suitable as catalysts they should have uniform pore diameters of about 6 to about 15 A. preferably 10 to 13 A. A conventional scheme for preparing sodium synthetic faujasite is as follows:

Colloidal silica or silica hydrosol is mixed with a solution of sodium hydroxide and sodium aluminate at ambient temperature. Suitable reactant molar ratios are within the following ranges: $Na_2O/SiO_2$, 0.28 to 0.80; $SiO_2/Al_2O_3$, 7 to 40; $H_2O/Na_2O$, 20 to 60. In order to aid crystallization, the reaction mixture may be either digested at ambient temperature for up to 40 hours or more, e.g. 1 to 15 hours, or cooled to below about 100° F., after which it is heated to 180° to 250° F., e.g. 200° to 220° F., and held at said temperature for a sufficient period to crystallize the product and preferably to achieve maximum crystallinity, e.g. 24 to 200 hours or more, typically 50 to 100 hours. A crystalline hydrated sodium alumino-silicate zeolite having a faujasite structure is then separated from the aqueous mother liquor by decantation or filtration and washed to recover a crystalline product. After additional modification by cationic exchange as hereinafter described, it is calcined at temperatures up to about 1000° F. in order to remove the water of hydration.

As mentioned, the above procedure is utilized for the production of zeolites having the synthetic faujasite structure utilizing appropriate reactant mole ratios as described, for example, in U.S. Patent Nos. 2,882,244 and 3,013,988. By alteration of the reactant mole ratios, it may also be used for the preparation of zeolites having less preferred silica to alumina mole ratios of about 2.0. This type of zeolite is described, for example, in U.S. Patent No. 2,882,243 and designated therein as Zeolite A. A somewhat altered procedure, performed at elevated temperaure and pressure, may be used to produce zeolites having the synthetic mordenite structure as described, for example, in the Journal of the Chemical Society (1948) pp. 2158–2163.

The above-described crystalline zeolites have recently gained wide acceptance as catalysts and catalyst supports for hydrocarbon conversion processes, e.g. catalytic cracking hydrocracking, etc. This has proven particularly true of the synthetic faujasite type of zeolite. When these zeolites are to be used as catalysts, they must necessarily be treated with a suitable exchange solution to reduce their alkali metal oxide (e.g $Na_2O$) content to less than about 10 wt. percent, preferably less than about 6 wt. percent, e.g. 1 to 5 wt. percent, since alkali metal oxides do not promote the desired hydrocarbon conversion reactions.

The present invention is concerned with the discovery that partial or total replacement of M in the above zeolite formula with manganese ion will improve the catalytic properties of the zeolite and result in a superior hydrocarbon conversion catalyst composition. For example, use of these manganese-containing catalysts has been found to produce significantly greater yields of higher octane gasoline product and lower gas make than either the conventional catalyst compositions or a recently developed catalyst composition, hereinafter to be described, which has gained wide acceptance.

The replacement of M in the above formula with manganese ion may be accomplished by conventional ion exchange. The alkali metal oxide (e.g. Na₂O)-containing zeolite is slurried in an aqueous solution containing a soluble manganese salt at temperatures of about 60° to 150° F. Suitable manganese salts include the sulfate, chloride, nitrate, acetate, thiocyanate, etc. The ion exchange should be continued until at least about 10 to 20%, preferably at least about 25%, of the alkali metal in the zeolite has been replaced with manganese ion. However, in all cases, the alkali metal oxide content of the zeolite should be reduced to below about 10 wt. percent, preferably below about 8 wt. percent, most preferably below about 7 wt. percent. This reduction may be totally accomplished via the above-described manganese ion exchange. Optionally, a portion of the residual alkali metal may be replaced with still another metal cation. Thus, in some instances, it may be advantageous to substitute other mono- or divalent ions for a portion of the residual alkali metal oxide in the zeolite so as to enhance activity or impart other desirable qualities to the catalyst while still maintaining a high degree of stability. Especially useful for this purpose are some of the metals of Groups I-B, II-A, II-B, and III-A, as well as the Lanthanum and Actinium series. In this instance, therefore, M in the final exchanged zeolite will represent a mixture of manganese ion, one of the above metal ions, and usually a small amount of the original alkali metal ion which has not been replaced.

After the above ion exchange treatment, the zeolite is washed free of soluble ion, dried at 225 to 500° F., and calcined at 750 to 1000° F. to remove water of hydration.

Thus, in addition to the aforementioned requisite alkali metal oxide content, the zeolite product will usually contain a minor amount of manganese oxide, e.g. about 0.5 to about 10 wt. percent, preferably 1 to 5 wt. percent, manganese oxide, and 0 to about 10 wt. percent of one of the above-mentioned metal ions (if the above optional exchange is employed). These amounts will of course vary with the type of zeolite being used, and will depend upon the number and amount of initial accessible alkali metal cation sites in the zeolite structure.

The manganese-containing zeolite as prepared above may be used directly as a hydrocarbon conversion catalyst, e.g. in cracking, hydrocracking, etc., processes. It may also be further modified by impregnation and ion exchange with other metals or their oxides, sulfides, etc., by conventional means.

One such valuable modification, which is particularly useful for hydrocracking purposes, is impregnation of the manganese-containing zeolite with a minor amount of a platinum group metal or metal compound. This may be accomplished by treating the manganese-containing zeolite with a platinum or palladium salt or ammonium complex, e.g. ammonium chloroplatinate, palladium chloride, etc. The amount of platinum group metal in the finished catalyst should generally be about 0.01 to about 5.0 wt. percent preferably 0.1 to 3.0 wt. percent, based on the zeolite. Normally the catalyst is subjected to a heat or hydrogen treatment at elevated temperatures, e.g. 500° to 1500° F., to activate the platinum group metal-containing zeolite.

As another modification, a minor amount of the zeolite catalyst, in any of the above forms, may be suitably embedded in a major amount of an amorphous material such as silica gel, or a cogel of silica and at least one other metal oxide, wherein the metal is selected from Groups II-A, III-A, and IV-B of the Periodic Table, e.g. alumina, titania, magnesia, etc. Mixtures of two or more of such gels and cogels may be used. Silica-alumina gel will be especially preferred. The use of such composite materials, e.g. crystalline manganese-containing zeolite embedded in a silica-alumina cogel matrix, has been found useful in certain applications. For example, the activity of the pure crystalline zeolite is very often too high and, to achieve desired selectivities in the cracked or hydrocracked product streams, it is often desirable to utilize a composite form of zeolite-matrix catalyst. Additionally, for fluidized and moving bed operations, the crystals of zeolite are often too fine for successful fluidization due to excessive attrition and carryover losses. The use of a composite catalyst comprising zeolite crystals embedded in a suitable matrix, e.g. a silica or silica-alumina matrix, obviates these difficulties since the composite material can be formed into particles of a desired size range. Convenient means of forming the composite form of catalyst include physical mixing of the two solid materials or incorporation of the modified zeolite crystals into a suitable hydrogel, e.g. a silica-alumina hydrogel, subjecting the resulting mixture to high agitation conditions with added water, if necessary, to produce a homogeneous fluid dispersion, and finally spray drying the resulting mixture to form particles of the desired size. The final composite can contain about 1 to 50 wt. percent of the manganese-zeolite, preferably about 4 to 30 wt. percent, most preferably about 4 to 10 wt. percent; and about 50 to 99, preferably about 70 to 96, most preferably about 90 to 96, wt. percent of the amorphous gel.

As previously mentioned, the manganese-containing zeolites have been found to be highly superior catalysts, even when compared to recently developed catalysts which have gained wide industrial acceptance. One such catalyst, which is similar to the catalysts of the present invention except for the omission of manganese, comprises a crystalline zeolite which has been base-exchanged with a hydrogen-containing cation to reduce its alkali metal oxide content to the aforementioned low levels, and which is then composited with a platinum group metal as previously described. Under comparable operating conditions the "manganese form" of this catalyst is substantially superior to the same catalyst in the "hydrogen form" which, as mentioned, has been utilized quite extensively.

The above-described catalysts may be employed to convert a wide variety of hydrocarbon feeds of various origins; for example, petroleum, various fractions therefrom such as catalytic recycle stocks, gas oil, topped crude, etc., as well as shale oil, synthetic oils, etc. These feeds may contain appreciable quantities of impurities; e.g. oxygen, sulfur, nitrogen, and soluble metal compounds.

Operating details for the hydrocarbon conversion processes are well known in the art. Fixed, moving or fluidized bed or slurry phase operation may be employed. The feed stock is contacted with the catalyst at suitable temperatures, feed rates, pressures, etc., to thereby effect a substantial conversion to lower boiling materials, such as gasoline, middle distillate, etc. For catalytic cracking, suitable operating conditions will usually include a temperature of about 500° to 1200° F., preferably 750° to 1000° F.; a pressure of about 0 to 500 p.s.i.g., preferably 0 to 200 p.s.i.g.; and a space velocity of 0.2 to 20, preferably 1 to 10, volumes of feed per volume of catalyst per hour. For hydrocracking, suitable operating conditions include a temperature of about 500° to 1000° F., preferably 700° to 950° F.; a pressure of about 500 to 300 p.s.i.g., preferably 800 to 2000 p.s.i.g.; a space velocity of 0.2 to 20, preferably 1 to 10 v./v./hr.; and a hydrogen rate of about 500 to 20,000 preferably 1000 to 10,000, s.c.f. per barrel of oil feed.

The invention will be further understood by reference to the following examples, which are given for illustrative purposes only and are not intended to be limiting.

*Example 1.—Preparation of crystalline zeolite catalyst*

A crystalline sodium alumino-silicate zeolite of the synthetic faujasite type having uniform pore openings of about 10 to 13 A. and a silica to alumina mole ratio of about 5.3 was prepared by the following procedure. A solution of 85 grams of commercial sodium aluminate (containing 38 wt. percent $Na_2O$, 38 wt. percent $Al_2O_3$, and 24 wt. percent $H_2O$), and 300 grams of 97% sodium hydroxide (75 wt. percent $Na_2O$), contained in 1075 cc. of water, was added with stirring, at ambient temperature, to 1930 grams of a commercially available aqueous sol of colloidal silica containing 30 wt. percent $SiO_2$ ("Ludox" solution supplied by E. I. du Pont de Nemours & Co.).

The reaction mixture was stirred at ambient temperature for about 4 hours. The homogeneous mixture was then heated to a temperature of about 212° F. and aged at said temperature for about 5½ days, at which point the zeolite product had sufficiently crystallized. The crystalline product was then filtered and water washed until the wash water showed a pH of about 9.5. After oven drying at about 250 to 300° F., the sodium form of the catalyst showed the following analysis: 13.7 wt. percent $Na_2O$, 66.8 wt. percent $SiO_2$, and 21.3 wt. percent $Al_2O_3$; which corresponds to a molar formula of 1.07 $Na_2O:1.0\ Al_2O_3:5.3\ SiO_2$.

The above zeolite product was then subjected to cationic exchange with a manganese sulfate solution. 1000 grams of the dried zeolite was stirred in 2 liters of water containing 900 grams of $MnSO_4 \cdot H_2O$ at 80° F. for about 30 minutes. After a total of three successive exchanges, with the zeolite being filtered between exchanges and then contacted with fresh $MnSO_4 \cdot H_2O$ solution, the $Na_2O$ content of the zeolite had been reduced to 51% of its original value. After oven drying at 250 to 300° F. the zeolite showed the following analysis: 6.7 wt. percent $Na_2O$, 3.7 wt. percent MnO, 20.7 wt. percent $Al_2O_3$, and 66.0 wt. percent $SiO_2$; which corresponds to a molar formula of 0.53 $Na_2O:0.26\ MnO:1.0\ Al_2O_3:5.41\ SiO_2$. By X-ray analysis the product exhibited a typical faujasite structure and had a crystallinity of 97% as compared to a standard reference sample taken as having a crystallinity of 100.

*Example 2.—Catalytic cracking*

The manganese-containing zeolite of Example 1 was pelleted, crushed to 14–35 mesh, and calcined for 16 hours at 1000° F. The granular catalyst was charged to a small fixed-bed cracking unit for evaluation as a cracking catalyst. Its performance was compared to that of a conventional amorphous silica-alumina catalyst containing 25% alumina and 75% silica, which is commercially available from Davison Chemical Co. Tests were made at various feed rates and conversion levels using an East Texas light gas oil feed having a boiling range of 502 to 678° F., a gravity of 33.3° API, and a sulfur content of 0.2%. The results of there tests are shown in the following table which illustrate the superior product distribution and activity (as evidenced by lower feed rate at constant conversion) obtained with the manganese-containing zeolite catalyst.

TABLE I.—CATALYTIC CRACKING OF EAST TEXAS LIGHT GAS OIL

[Temperature, 832° F.; Pressure, Atm.; Cycle Time, 5 Min.]

| | Catalyst | |
|---|---|---|
| | Manganese-Crystalline Zeolite | Amorphous Silica-Alumina |
| Conversion to 430° F.-, Wt. Percent | 60 | 60 |
| W./w./hr | 27 | 1 |
| Product Distribution, Wt. Percent: | | |
| Carbon | 6.0 | 6.0 |
| $C_4$ | 9.0 | 21.0 |
| $C_5$–430° F. Gasoline | 45.0 | 33.0 |

Further tests were made at varying feed rates and conversion levels with the manganese-containing zeolite catalyst and are summarized in Table II, which demonstrates the high activity of the catalyst of the invention.

TABLE II.—CATALYTIC CRACKING OF EAST TEXAS LIGHT GAS OIL

[Temperature, 832° F.; Pressure, Atm.; Cycle Time, 5 Min.]

| | Catalyst | | |
|---|---|---|---|
| | Manganese-Crystalline Zeolite | | |
| Percent MnO | 3.7 | 3.7 | 3.7 |
| Percent $Na_2O$ | 6.7 | 6.7 | 6.7 |
| Feed Rate: W./w./hr | 4.9 | 8.2 | 17.7 |
| Conversion to 430° F.-, Wt. Percent | 98.4 | 94.6 | 70.9 |
| Product Dist., Wt. Percent: | | | |
| Carbon | 20.0 | 16.1 | 8.7 |
| $C_4$ | 28.5 | 20.4 | 12.2 |
| $C_5$–430° F. | 49.9 | 58.1 | 50.0 |
| 430° F.+ | 1.6 | 5.4 | 29.1 |
| $C_4$-Gas, Mol. Percent: | | | |
| $H_2$ | 4.2 | 3.7 | 2.8 |
| $CH_4$ | 10.8 | 10.1 | 8.2 |
| $C_2H_4$ | 6.8 | 7.0 | 8.1 |
| $C_2H_6$ | 4.5 | 4.5 | 4.1 |
| $C_3H_6$ | 6.1 | 10.6 | 15.2 |
| $C_3H_8$ | 23.8 | 20.3 | 18.3 |
| $C_4H_8$ | 1.6 | 3.7 | 5.1 |
| $i\text{-}C_4H_{10}$ | 33.8 | 32.7 | 31.4 |
| $n\text{-}C_4H_{10}$ | 8.4 | 7.4 | 6.8 |
| $i/n\text{-}C_4H_{10}$ Ratio | 4.0 | 4.4 | 4.6 |

*Example 3.—Catalytic cracking*

To further demonstrate the catalytic cracking characteristics of the catalyst compositions of the present invention a series of runs similar to those of the previous example was performed, using the same East Texas light gas oil feed, a temperature of 950° F., atmospheric pressure, and a cycle time of 2 minutes. The following three catalyst compositions were tested:

(1) Pure manganese-containing crystalline zeolite as prepared in Example 1;
(2) A conventional amorphous silica-alumina catalyst containing 13% alumina and 87% silica;
(3) A catalyst composition containing 5 parts by weight of the above manganese-containing zeolite and 95 parts by weight of the above silica-alumina catalyst containing 13% alumina, prepared by grinding the two materials to a fine powder, which powder was then pelleted, crushed, and screened to obtain granules having a 14–35 mesh size.

The results of these three tests are summarized in the following table:

TABLE III.—CATALYTIC CRACKING OF EAST TEXAS LIGHT GAS OIL

[Temperature, 950° F.; Pressure, Atm.; Cycle Time, 2 Min.]

| | Catalyst | | |
|---|---|---|---|
| | 100% Mn-Crystalline Zeolite | 5% Mn-Crystalline Zeolite Plus 95% Amorphous Silica-Alumina | 100% Amorphous Silica-Alumina |
| Conversion to 430° F.-, Wt. Percent | 95.9 | 67 | 67 |
| Relative Activity | 60 | 3.3 | 1 |
| Product Distribution, Wt. Percent: | | | |
| Carbon | 9.2 | 4.0 | 6.6 |
| $C_3$-Gas | 12.7 | 10.5 | 14.6 |
| $C_4$ Gas | 17.2 | 14.6 | 18.0 |
| $C_5$–430° F. Gasoline | 56.8 | 37.9 | 28.0 |

As shown in the above table, the pure manganese-containing crystalline zeolite was extremely active and produced a high yield of gasoline. However, because of its extremely high activity, overconversion to carbon by-products may occur. It will therefore be sometimes desirable to incorporate the zeolite catalyst into amorphous silica-alumina. As illustrated by the above data, inclusion of only 5% of the manganese-containing zeolite catalyst in 95% amorphous silica-alumina resulted in an activity increase of more than 3 times the activity of the amorphous silica-alumina. In addition, the carbon make was decreased by about 39%, the $C_3^-$ gas make was decreased by about 28%, and the $C_4$ gas make was decreased by about 19%. Furthermore, the gasoline yield with the combination zeolite-silica-alumina catalyst was about 35% greater than the silica-alumina alone. Thus, when the extremely high conversion (95.9%) obtained with the undiluted manganese-zeolite catalyst is not needed, a superior catalyst composition may be prepared by incorporating the zeolite catalyst into conventional amorphous silica-alumina, thereby conferring superior catalytic properties and improved product distribution.

Example 4.—Catalytic cracking

A synthetic mordenite (commercially available from the Norton Company) is exchanged with manganese sulfate solution, dried, pelletized, crushed and calcined, following the procedure of Examples 1 and 2. The catalyst contains about 3 wt. percent MnO. It is used to crack the East Texas light gas oil of Example 2 following the procedure and conditions of Example 3. A substantial portion of the feed is converted to valuable lower boiling products.

Example 5.—Hydrocracking

A portion of the manganese-containing zeolite catalyst of Example 1 was composited with palladium by slurrying 240 grams of dry zeolite in 750 cc. of water at 80° F. and adding with stirring 75 cc. of $Pd(NH_3)_4Cl_2$ solution containing 1.2 grams palladium. Stirring was continued for about 1 hour, after which the catalyst was filtered, washed and oven dried at 275° F. The final catalyst contained 0.5 wt. percent palladium based on the dry zeolite. It was then pilled for use in a fixed-bed reactor.

The manganese-containing zeolite of Example 1 and the palladium-manganese-containing zeolite prepared above were used in fixed-bed operation to hydrocrack a light catalytic cycle oil having a gravity of 33.7° API and a boiling range (5% and 95% points) of 440 to 590° F. The operating conditions, conversion, product distribution and product quality characteristics for these tests are summarized in the following table.

The palladium-manganese-zeolite catalyst recovered from the above runs was freed of adsorbed hydrocarbons by air oxidation and examined for structural stability by X-ray diffraction analysis. The crystallinity was found to be 87% as compared to the standard reference sample.

Example 6—Hydrocracking

This example compares the hydrocracking performance of palladium-containing manganese form zeolite, palladium-containing hydrogen form zeolite, and manganese form zeolite.

A synthetic crystalline sodium alumino-silicate zeolite of the faujasite type was prepared by the procedure of Example 1 with a reaction mixture containing the following molar ratios of reactants: $SiO_2/Al_2O_3$, 10:1; $Na_2O/Al_2O_3$, 3:1; and $H_2O/SiO_2$, 12:1. The crystallization time was 5 days and $Na_2O$ content of the zeolite product was 13.7%.

The zeolite was then exchanged once with 31% ammonium chloride solution (1.4 g. salt/g. zeolite) at 80° F. for 3 hours and then three additional times with ammonium sulfate solution under the same conditions except at 150 to 160° F. The exchanged zeolite was washed free of soluble salts and after oven drying at 225° to 250° F. had a $Na_2O$ content of 1.85 wt. percent. Manganese was introduced into this low soda ammonium-form zeolite by exchanging three times at 80° F. (1 hour per exchange) with 450 g. $MnSO_4 \cdot H_2O$ in 2 liters water per 600 g. zeolite. A portion of this preparation, which contained 1.8 wt. percent $Na_2O$, 1.8% $NH_3$, and 5.9 MnO, was pilled for use in a fixed-bed hydrocracking reactor after calcining for 16 hours at 450°, 4 hours at 600°, 2 hours at 750°, and 2 hours at 1000° F. The catalyst was designated Catalyst "A."

A second portion of the above low soda manganese zeolite was composited with palladium by slurrying 218 g. in 700 cc. water at 80° F. and adding, with stirring, 1.1 g. of palladium as an aqueous solution of $$Pd(NH_3)_4Cl_2$$

Stirring was continued for about 1 hour, after which the catalyst was filtered, washed with a small amount of TABLE IV.—HYDROCRACKING OF LIGHT CATALYTIC CYCLE OIL WITH MANGANESE-CONTAINING ZEOLITE CATALYSTS

| | Catalyst | | | | | |
|---|---|---|---|---|---|---|
| | Manganese-Zeolite | | | | Palladium-Manganese-Zeolite | |
| Operating Conditions: | | | | | | |
| Pressure, p.s.i.g. | 1,000 | | | | 1,000 | |
| Feed Rate, v./v./hr. | 1 | | | | 1 | |
| $H_2$ Rate, CF/B | 5,000 | | | | 5,000 | |
| Temp., °F. | 600 | | 750 | | 710 | |
| Conversion to 430° F.-, Wt. percent | 19 | | 28 | | 89 | |
| | Wt. percent | Vol. percent | Wt. percent | Vol. percent | Wt. percent | Vol. percent |
| Product Distribution (Output): | | | | | | |
| $C_3$ | 0.5 | -------- | 1.5 | -------- | 3.2 | -------- |
| $C_4$ | 0.9 | 1.3 | 1.0 | 1.5 | 8.5 | 12.2 |
| $C_5$–430° F. | 17.6 | 18.6 | 24.7 | 26.6 | 76.9 | 91.0 |
| 430° F.+ | 81.0 | 80.5 | 72.8 | 73.0 | 11.4 | 12.1 |
| Naphtha Inspection ($C_5$–430° F.): | | | | | | |
| RON+3 cc. TEL | [1] 98.9 | [1] 98.9 | [1] 98.9 | [1] 98.9 | [2] 99.7 | [2] 99.7 |
| MON+3 cc. TEL | [1] 89.3 | [1] 89.3 | [1] 89.3 | [1] 89.3 | [2] 103.0 | [2] 103.0 |
| Percent Aromatics (FIA) | 31 | 31 | 41 | 41 | -------- | -------- |
| Gravity, °API | 43 | 43 | 46 | 46 | 65 | 65 |
| 430° F.+ Fraction Inspections: Gravity, °API | 32.8 | 32.8 | 34.1 | 34.1 | 43.4 | 43.4 |

[1] Octane number data on composite of 600° and 750° F. operations.
[2] Blended octanes (50/50 in pool base, 96.2 RON; 88.0 MON).

Both manganese-containing catalysts with and without the added palladium gave outstanding results. In both cases the $C_3^-$ gas make was low. Even at 89% conversion with the palladium-containing catalyst the gas make was only 3.2%. Both catalysts produced high octane gasoline although at different conversion levels.

water, and oven dried at 250° to 275° F. The dried preparation contained 0.5 wt. percent Pd and was pilled for use in a fixed-bed reactor after calcining to 1000° F. by the above schedule. The catalyst was designated Catalyst B.

A third catalyst, Catalyst C, was prepared by the procedures for Catalysts A and B except that the manganese exchange was eliminated. This catalyst thus comprised 0.5 wt. percent palladium on the hydrogen form of the zeolite. (Ammonium form converts to hydrogen form upon evolution of $NH_3$ during calcination.)

Catalysts A, B, and C were used in fixed-bed operation to hydrocrack the light catalytic cycle oil used in Example 5. The operating conditions, conversion, product distribution, and product quality characteristics for these tests are summarized in Table V.

TABLE V.—HYDROCRACKING OF LIGHT CATALYTIC CYCLE OIL

| Catalyst Description | Catalyst | | |
|---|---|---|---|
| | "A" | "B" | "C" |
| | Manganese-Zeolite | Palladium-Zeolite | Palladium-Zeolite |
| Operating Conditions: | | | |
| Pressure, p.s.i.g. | 1,000 | 1,000 | 800 |
| Feed Rate, v./v./hr. | 0.98 | 1.0 | 1.3 |
| $H_2$ Rate, C.F./B. | 3,862 | 4,071 | 10,000 |
| Temp., °F. | 700 | 607 | 650 |
| Conversion to 430° F.-, Wt. percent | 18.1 | 71.2 | 71.0 |
| Product Distribution (Output): | | | |
| $C_3$-, Wt. percent | 0.8 | 1.1 | 6.8 |
| $C_4$, Vol. percent | 1.8 | 2.8 | 24.0 |
| $C_5$, Vol. percent | 2.1 | 5.4 | |
| $C_5$-430° F., Vol. percent | 29.5 | 81.3 | 60.0 |
| 430° F.+, Vol. percent | 81.5 | 30.3 | 30.1 |
| Naphtha Inspection ($C_5$-400°): | | | |
| RON+3 cc. TEL | 97.0 | 90.8 | 95 |
| MON+3 cc. TEL | | 90.0 | 88 |

Comparison of Catalysts A and B shows that the addition of 0.5 wt. percent palladium to the low soda manganese zeolite resulted in a very pronounced increase in conversion activity. The highly active palladium-manganese-containing zeolite (Catalyst B) produced cracked products having an exceptionally favorable product distribution characterized by low gas ($C_3$- and $C_4$) make and high gasoline ($C_5$-430° F.) yield.

Comparison of Catalysts B and C shows the superiority of the manganese form zeolite over the hydrogen form. Catalyst C represents a recently developed and widely accepted catalyst. As indicated, Catalyst B produced significantly lower gas make and higher gasoline yield.

What is claimed is:

1. A process for hydrocracking hydrocarbons which comprises contacting said hydrocarbons at hydrocracking conditions in the presence of added hydrogen with a crystalline alumino-silicate zeolite having uniform pore openings of about 6 to about 15 A. and containing less than about 10 wt. percent alkali metal oxide by virtue of base exchange with manganese ion, said zeolite being further combined with a minor amount of a platinum group metal.

2. The process of claim 1, wherein said zeolite is a synthetic faujasite having a silica-to-alumina mole ratio of about 3.

3. The process of claim 1 wherein said zeolite is a synthetic faujasite having a silica-to-alumina mole ratio between 4 and 5.5.

4. The process of claim 1, wherein at least about 25% of the original alkali metal cationic content of said zeolite has been replaced with manganese cation.

5. The process of claim 4, wherein a portion of the residual alkali metal cationic content of said zeolite is replaced with a second metal cation selected from the group consisting of cations of metals in Groups I-B, II-A, II-B, III-A and metals in the Lanthanum and Actinium series.

6. The process of claim 1, wherein said zeolite contains about 0.01 to about 5 wt. percent palladium.

7. The process of claim 1, wherein a minor amount of said zeolite is embedded in a major amount of an amorphous gel selected from the group consisting of silica gel, cogels of silica and at least one other oxide of a metal selected from Groups II-A, III-A and IV-B of the Periodic Table, and mixtures thereof.

8. The process of claim 7, wherein said amorphous gel is silica-alumina gel.

9. The process of claim 8, wherein said major amount is in the range of about 70 to 96 wt. percent and wherein said minor amount is in the range of about 4 to 30 wt. percent.

10. The process of claim 1, wherein said zeolite is of the synthetic mordenite variety.

11. A process for hydrocracking hydrocarbons which comprises contacting said hydrocarbons with a catalyst composition comprising synthetic faujasite, said faujasite having a silica-to-alumina mole ratio between 4 and 5.5 and uniform pore openings of about 6 to 15 A., and having been both base exchanged with manganese cation to reduce its alkali metal oxide content to less than about 6 wt. percent and combined with about 0.01 to 5 wt. percent platinum group metal, said process being conducted in the presence of added hydrogen at a rate of about 500 to 20,000 s.c.f. per barrel of feed and at a temperature of about 500 to 1000° F., a pressure of about 500 to 3000 p.s.i.g. and a space velocity of about 0.2 to 20 v./v./hr.

References Cited

UNITED STATES PATENTS

| | | | |
|---|---|---|---|
| 2,983,670 | 5/1961 | Seubold | 208—110 |
| 3,130,006 | 4/1964 | Rabo et al. | 23—110 |
| 3,140,251 | 7/1964 | Plank et al. | 208—120 |
| 3,210,267 | 10/1965 | Plank et al. | 208—120 |
| 3,236,761 | 2/1966 | Rabo et al. | 208—111 |
| 3,236,762 | 2/1966 | Rabo et al. | 208—111 |
| 3,247,098 | 4/1966 | Kimberlin | 208—120 |

DELBERT E. GANTZ, *Primary Examiner.*

PAUL M. COUGHLAN, *Examiner.*

A. RIMENS, *Assistant Examiner.*